C. P. FUNK.
RESILIENT WHEEL.
APPLICATION FILED SEPT. 23, 1910.
989,701.
Patented Apr. 18, 1911.
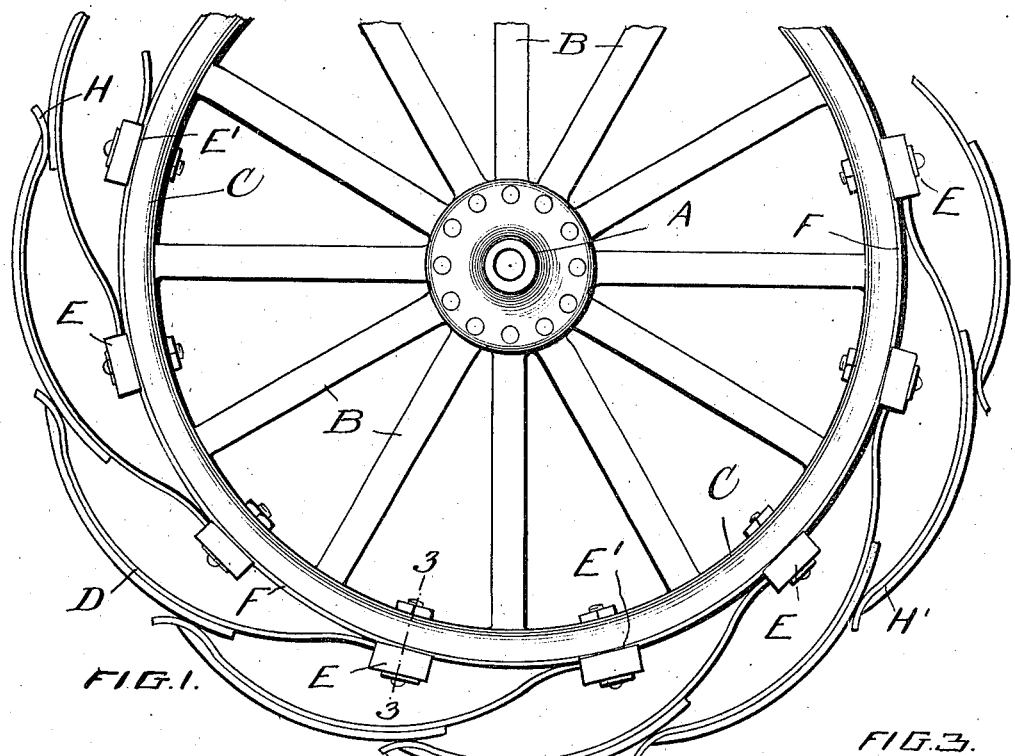
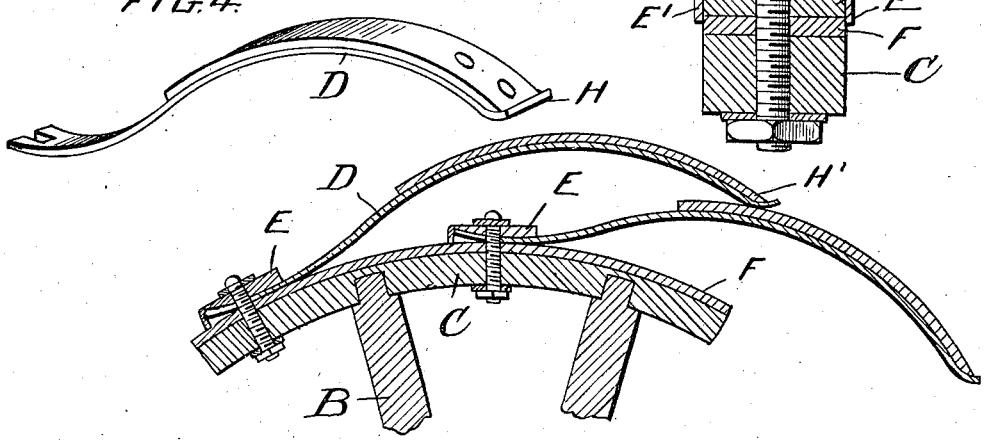

UNITED STATES PATENT OFFICE.

CAPTAIN PERRY FUNK, OF JEROMEVILLE, OHIO.

RESILIENT WHEEL.

989,701. Specification of Letters Patent. Patented Apr. 18, 1911.

Application filed September 23, 1910. Serial No. 583,520.

*To all whom it may concern:*

Be it known that I, CAPTAIN P. FUNK, a citizen of the United States, residing at Jeromeville, in the county of Ashland and State of Ohio, have invented certain new and useful Improvements in Resilient Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient wheels and comprises various details of construction and combinations and arrangements of parts which will be hereinafter fully described and then specifically defined in the appended claim.

I illustrate my invention in the accompanying drawings in which—

Figure 1 is a side plan view of the wheel made in accordance with my invention. Fig. 2 is a sectional view. Fig. 3 is a cross sectional view of line 3—3 of Fig. 1 and Fig. 4 is an enlarged detail perspective view of a spring.

Reference now being had to the details of the drawings by letter, A designates the hub of a wheel and B the spokes, and C the rim. At intervals about the rim preferably between each pair of spokes, one end of the spring D is fastened by means of a clamping member E, which passes over the rim and has flanges E' adapted to engage the edges of the tire F upon the rim. Said springs D are preferably of the shape shown in the drawings overlapping one another and the outer free end of each spring has an outwardly curved portion H, and fastened to the outer portion of each face adjacent to its free end is a strip of leather H'. It will be noted that the free end of each spring rests upon the leather strip H', thereby serving to form a noiseless wheel.

A wheel made in accordance with my invention having a series of springs fastened as shown over-lapping one another and designed to take up vibration will produce an effect quite equal to that obtained by a pneumatic wheel.

What I claim to be new is,—

In combination with the rim of a wheel, a series of clamping plates, a bolt passing through apertures therein and apertures in the rim of a wheel, a series of springs each having a fixed end which is curved and slotted to receive one of said bolts, the inner surface of each clamping member being convexed and adapted to receive the curved end of the spring, said springs having overlapping portions and their outer free ends curved outwardly, and a strip of leather fastened to the outer face of each spring and terminating adjacent to its free end and against which an overlapping spring is adapted to bear.

In testimony whereof I hereunto affix my signature in the presence of two witnesses.

CAPTAIN PERRY FUNK.

Witnesses:
G. E. ALLEMAN,
C. T. ALLEMAN.

---

Copies of this patent may be obtained for five cents each, by addressing the "Commissioner of Patents, Washington, D. C."